United States Patent [19] [11] Patent Number: 4,473,232
Umeha et al. [45] Date of Patent: Sep. 25, 1984

[54] OIL SCRAPER RING WITH CONTROLLED GAP ARRANGEMENT

[75] Inventors: Genkichi Umeha, Tokyo; Takeji Tsuchiya, Saitama, both of Japan

[73] Assignee: Nippon Piston Ring Co., Ltd., Tokyo, Japan

[21] Appl. No.: 543,545

[22] Filed: Oct. 19, 1983

[30] Foreign Application Priority Data

Oct. 19, 1982 [JP] Japan ................ 57-183348

[51] Int. Cl.³ .............. F16J 9/06; F16J 9/12
[52] U.S. Cl. .................... 277/216; 277/1
[58] Field of Search .......... 277/216, 1, 217-222

[56] References Cited

U.S. PATENT DOCUMENTS 4,210,338 7/1980 Collings ............... 277/216 X
4,253,435 3/1981 McCandless ........... 277/216 X

FOREIGN PATENT DOCUMENTS 529072 11/1940 United Kingdom ........... 277/216
1160033 7/1969 United Kingdom ........... 277/216

OTHER PUBLICATIONS

Handbook of Mechanical Packings and Gasket Materials, issued by Mechanical Packing Association (New York: New York) 1960, "Power's Manual on Piston Rings" (pp. 1-24).
The Seals Book, published by Machine Design, Jan. 19, 1961, (pp. 24-31), ("Split-Ring Seals").
Tribology International, "Piston Rings for Slow and Medium Speed Engines," Feb. 1979, (pp. 3-14).
Industrial Sealing Technology, "Part 3, Piston Rings as Sealing Devices," H. Hugo Buchter, John Wiley & Sons, (New York: New York)(pp. 371-381).

Primary Examiner—Robert S. Ward
Attorney, Agent, or Firm—Sughrue, Mion, Zinn, Macpeak and Seas

[57] ABSTRACT

In an oil scraper ring in which an expander is arranged on the inner peripheral surface of an oil scraper ring proper, the oil scraper ring is manufactured to present the configuration of a perfect circle in its unstressed state with a free engaging gap cut into the ring.

4 Claims, 8 Drawing Figures

OIL SCRAPER RING WITH CONTROLLED GAP ARRANGEMENT

BACKGROUND OF THE INVENTION

The present invention relates to an oil scraper piston ring which is used in an internal combustion engine.

The oil scraper piston ring 1 (which will hereinafter be referred to as "oil scraper ring") is mounted in a piston ring groove 3 which is formed in a piston 2, as shown in FIG. 1. The piston 2 is mounted in a cylinder 4 which is processed to be perfectly circular. Compression rings 5 are mounted in piston ring grooves 31, which are provided above the oil scraper ring 1.

The primary purposes of the oil scraper ring are, for example, to act as a seal so that the lubricating oil does not enter the combustion chamber, and to scrape down the excessive lubricating oil which resides on the inner wall of the cylinder and return it to the oil pan thereby always producing a suitable lubricating oil film on the inner wall of the cylinder. Hence, what is most necessary for an oil scraper ring is that it be able to slide while it is in close contact with the inner wall of the cylinder.

Under these circumstances, many studies and developments have been made with respect to oil scraper rings. As a result of these studies there has widely been used an oil scraper ring of the integral type, as shown in FIG. 2, wherein a coiled expander 6 is fitted into a groove 13. The groove 13 is formed in the inner peripheral surface of an oil scraper ring of the integral type in which an oil window 12 is formed in an oil scraper ring proper 11.

The oil scraper ring of the integral type is manufactured so as to present the configuration of a cam having a free engaging gap in its unstressed state (i.e. with no external forces applied to the ring), and to present the configuration of a perfect circle only when it is mounted in a circular cylinder. In other words, when it is mounted on the piston and inserted into the cylinder so as to close the gap in the ring, the tension of both the oil scraper ring itself and that of the coiled expander may together press against the inner wall surface of the cylinder.

However, in the oil scraper ring of the integral type which is constituted so as to present the configuration of a perfect circle only when the free engaging gap is closed, there are several problems which are mentioned below. As a result of the study by the present inventor, it is clear that the oil scraper ring of the integral type is not preferable, because the oil scraper ring of the integral type does not sufficiently serve the primary purposes of an oil scraper ring.

In the usual manufacturing of the prior art oil scraper ring, the outer peripheral cam shape of the oil scraper ring is first formed, and the engaging portion is then cut apart so as to provide the free engaging gap. After that, the inner peripheral cutting is accomplished, followed in order, by the outer peripheral finishing, the formation of the outer peripheral groove, the formation of the oil window and the engaging portion finishing. All of the processing steps are effected with the free engaging gap closed, except for the engaging portion finishing. Therefore, it is difficult to obtain an oil scraper ring having an outer peripheral surface configuration which conforms exactly with the inner wall of a circular cylinder.

In addition, because the inner peripheral cutting takes place after the cutting of the free engaging gap portion, the outer peripheral finishing and the outer peripheral groove processing become intermittent cutting, because a gap has already been cut in the periphery. This causes many problems, for example, in that the life of the cutting tool becomes short and the cutting speed cannot be enhanced.

SUMMARY OF THE INVENTION

In view of the problems mentioned above, the present invention is designed to provide an oil scraper ring which overcomes the drawbacks of the prior art.

That is, the oil scraper ring in accordance with the present invention provides an expander arranged on the inner peripheral surface of the oil scraper ring proper. The oil scraper ring proper presents the configuration of a perfect circle when it is provided with the free engaging gap, and the expander is arranged on the inner peripheral surface in the oil scraper ring.

DETAILED DESCRIPTION OF THE INVENTION

Figure 1:
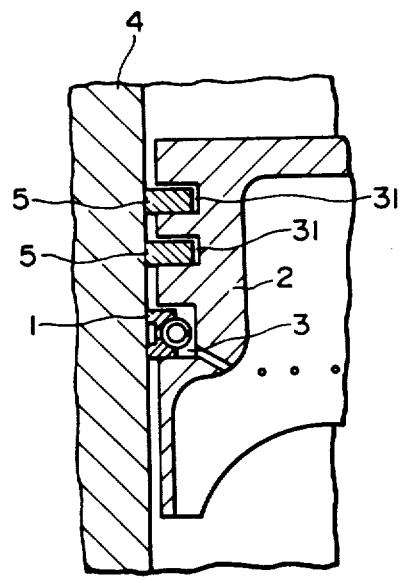
FIG. 1 is a cross-sectional view of the essential parts of the piston to which is mounted the oil scraper ring in accordance with the prior art.

The present invention will be described below in detail, with reference to the accompanying drawings in which the elements or parts which are the same as those shown in the drawing of the prior art have the same reference numerals.

Figure 3:
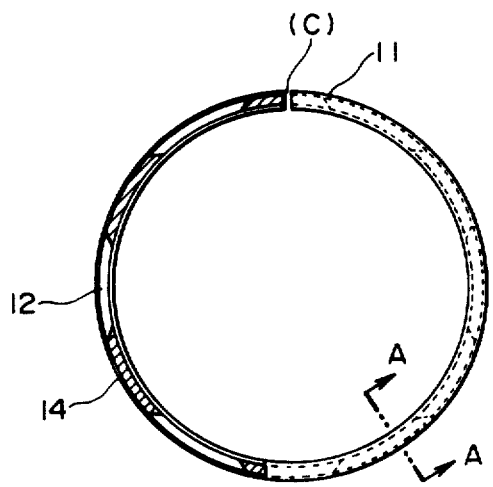
FIG. 3 is a plan view which is shown partially in cross section in the case where there is provided the free engaging gap of the oil scraper ring in accordance with the present invention.
Figure 2:
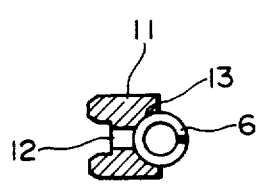
FIG. 2 is an enlarged cross-sectional view of the oil scraper ring which is shown in FIG. 1.
Figure 4:
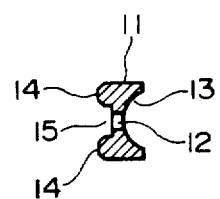
FIG. 4 is an enlarged cross-sectional view taken along line A—A in FIG. 3.

FIG. 3 is a plan view which is shown partially in cross section and which shows one embodiment of an oil scraper ring in accordance with the present invention in which there is provided a free engaging gap (C) of a ring proper 11. FIG. 4 is a cross-sectional view taken along line A—A in FIG. 3.

Figure 7:
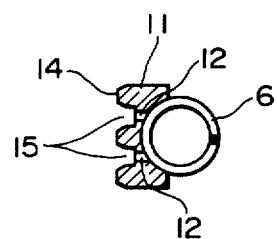
FIG. 7 and FIG. 8 are cross-sectional views of the oil scraper ring proper showing other embodiments in accordance with the present invention.
Figure 8:
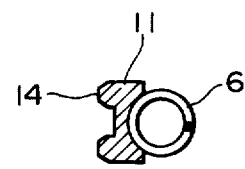

In accordance with the present invention, a recess 15 is formed in the outer peripheral surface 14 in the oil scraper ring proper, as shown in FIG. 3, so that the outer peripheral sliding surface is split 14, 14 in the peripheral direction. It goes without saying that the cross-sectional configuration of the oil scraper ring proper is not limited to that shown in FIG. 4, and that the well known cross-sectional configuration shown in FIG. 7, in which the outer peripheral surface is split into three surfaces, or the well known cross-sectional configuration without the oil window, shown in FIG. 8, are also acceptable.

An oil window 12 is intermittently provided in the peripheral direction so that openings from the recess 15 to the inner peripheral surface occur.

Figure 5:
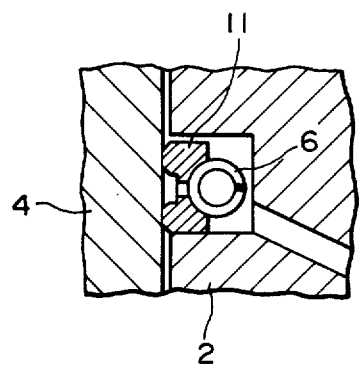
FIG. 5 is a cross-sectional view of the essential parts showing the coiled expander mounted to the oil scraper ring proper, as shown in FIG. 3.
Figure 6:
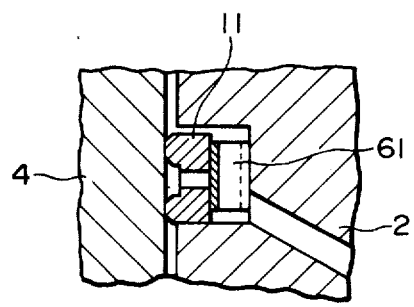
FIG. 6 is a cross-sectional view of the essential parts of another embodiment of the present invention.

In accordance with the present invention, a characteristic of the oil scraper ring proper 11 is that it presents a perfect circle configuration, even when the free engaging gap (C) is not closed, as clearly shown in FIG. 3. Therefore, since the oil scraper ring proper 11 is not provided with its own tension, it is formed with a groove 13 into which a coiled expander 6 is fitted. The groove 13 is formed in the inner peripheral surface and the coiled expander 6 is mounted in the groove 13, as shown in FIG. 5, so that the oil scraper ring proper 11 is pushed against the inner wall surface of the cylinder by the tension of the coiled expander. It goes without saying that the means to provide the tension in the outer peripheral direction, which is provided on the inner peripheral surface, is not limited to the coiled expander, but a plate expander 61 as shown in FIG. 6 may also be used. In general, any well-known expander may be used which is able to transmit the tension of the expander to the oil scraper ring proper 11.

Thus, since the oil scraper ring proper 11 presents the configuration of a perfect circle when the oil scraper ring proper is provided with the free engaging gap (C), it is possible to quite easily obtain an oil scraper ring in which the outer peripheral surface of the oil scraper ring completely coincides with the inner wall surface of a cylinder when it is mounted in a perfectly circular cylinder.

In other words, when an oil scraper ring in accordance with the present invention is manufactured so that the ring is perfectly circular, the manufacturing steps involve processing a true circle with a diameter which is the same as the inner diameter of the cylinder, e.g., the outer peripheral perfect circle processing, the inner peripheral true circle cutting, the outer peripheral perfect circle finishing, the outer peripheral perfect circle groove processing, and the oil window processing. All of these steps are performed without the need for cutting apart the engaging portion to obtain the desired configuration. In the case where the final outer peripheral surface processing step is the outer peripheral lapping, the engaging portion is cut apart immediately prior to this outer peripheral lapping. In the case where the final outer peripheral surface processing step is polishing, it is possible to cut apart the engaging portion after the final outer peripheral surface polishing.

The dimension of the cut for the engaging portion can be made to be the same dimension which is required at the time then the oil scraper ring proper is mounted into the cylinder, that is, the dimension for what is called the "set gap" which allows the oil scraper ring proper to have the configuration of a perfect circle. As a result, the free engaging gap of the oil scraper ring in accordance with the present invention and the set gap are of the same dimension.

As mentioned above, the oil scraper ring in accordance with the present invention is formed in such a way that the oil scraper ring proper presents the configuration of a perfect circle when it is provided with the free engaging gap. It therefore becomes possible to process the oil scraper ring proper by only processing a true circle without the cam processing of the prior art. As a result, it is possible to provide the oil scraper ring in the configuration of a perfect circle which completely coincides with the cylinder which is also processed perfectly circular. Hence, the oil leakage from the outer peripheral surface of the oil scraper ring proper, which has been a very serious problem heretofore, can be effectively prevented, and the function of the oil scraper ring proper is satisfactorily served.

In addition, since the intermittent cutting due to the existence of the engaging portion in the prior art ceases to exist, the life of the cutting tool used in fabricating the ring becomes long and the cutting speed is also enhanced. Thus, there is also the advantage that it is possible to produce the oil scraper ring quite efficiently.

What must be considered when using the oil scraper ring of the present invention is the stress at the time the ring is mounted. The result of an experiment which has been conducted by the present applicant has proven that it is possible to sufficiently cope with such stress by setting the outer peripheral diameter (D) divided by the thickness (T) equal to or higher than 34 when using high-class cast iron as the base material in the piston ring, and setting D/T equal to or higher than 38 when using steel material and ductile cast iron as the base material. To set D/T equal to or higher than 34 or 38 means that the cross section of the oil scraper ring proper is made small, and it therefore becomes possible to obtain an oil scraper ring whose weight is reduced and whose tendency to follow the inner wall of the cylinder is enhanced, because the bonding rigidity is made small, thereby displaying excellent performance.

In addition, because the oil scraper ring proper is tightly fastened by the coiled expander in accordance with the present invention, the oil scraper ring is securely mounted in the piston ring groove, which is an additional advantage of the present invention.

What is claimed is:

1. An oil scraper ring of the type having an outer peripheral surface, an inner peripheral surface and an expander and being insertable into a cylinder with its outer peripheral surface in contact with walls of said cylinder and urged against said cylinder walls under the force of said expander, said scraper ring having a gap formed therein in a freestanding unstressed state prior to insertion into said cylinder, said outer peripheral surface of said scraper ring being substantially circular in said unstressed state of said scraper ring.

2. An oil scraper ring as claimed in claim 1, wherein a groove is formed in said inner peripheral surface for receiving said expander.

3. An oil scraper ring as claimed in claim 2, wherein said expander is a coiled expander.

4. An oil scraper ring as claimed in claim 1, wherein said expander is a plate expander.

* * * * *